Aug. 13, 1940.   J. D. RYDER   2,211,711
TELEMETRIC SYSTEM
Filed May 28, 1937   3 Sheets-Sheet 1

Inventor
JOHN D. RYDER
By Raymond D. Junkins
Attorney

Aug. 13, 1940.                J. D. RYDER                2,211,711
                           TELEMETRIC SYSTEM
                          Filed May 28, 1937            3 Sheets-Sheet 2
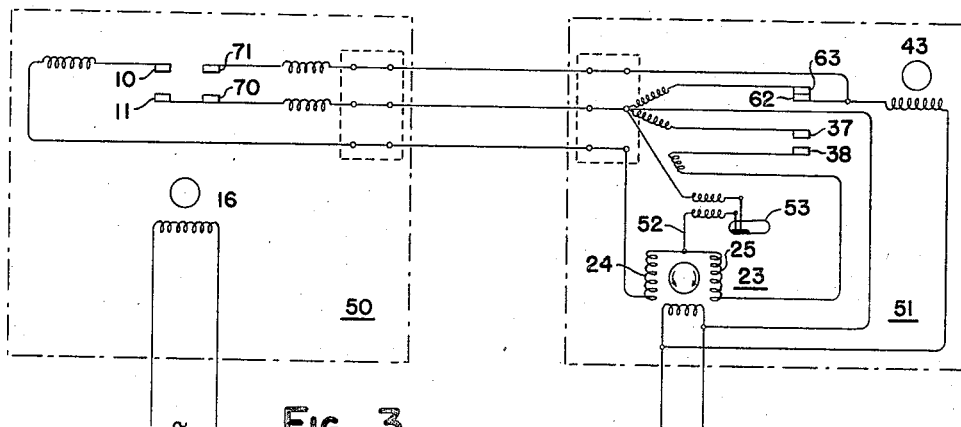
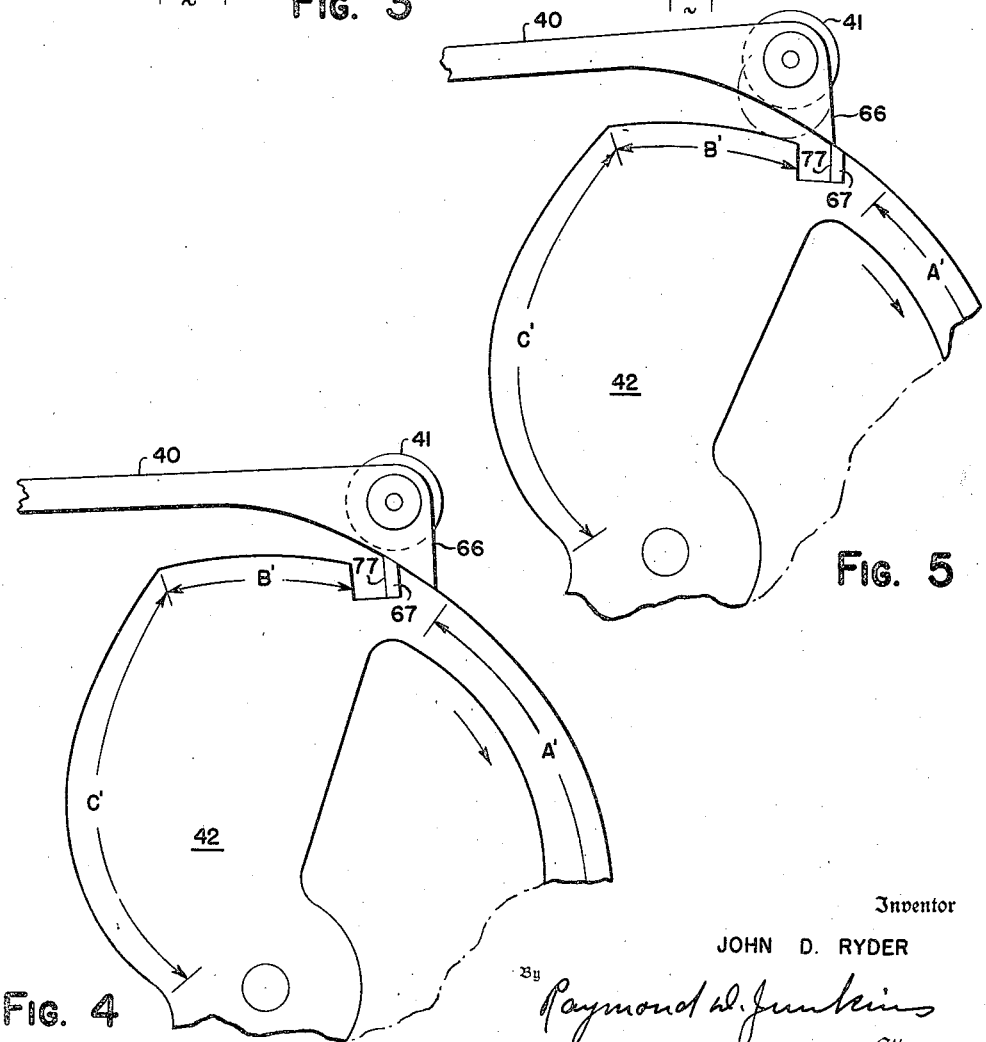
Inventor
JOHN D. RYDER
By Raymond W. Junkins
Attorney Aug. 13, 1940.　　　　J. D. RYDER　　　　2,211,711
TELEMETRIC SYSTEM
Filed May 28, 1937　　　3 Sheets-Sheet 3
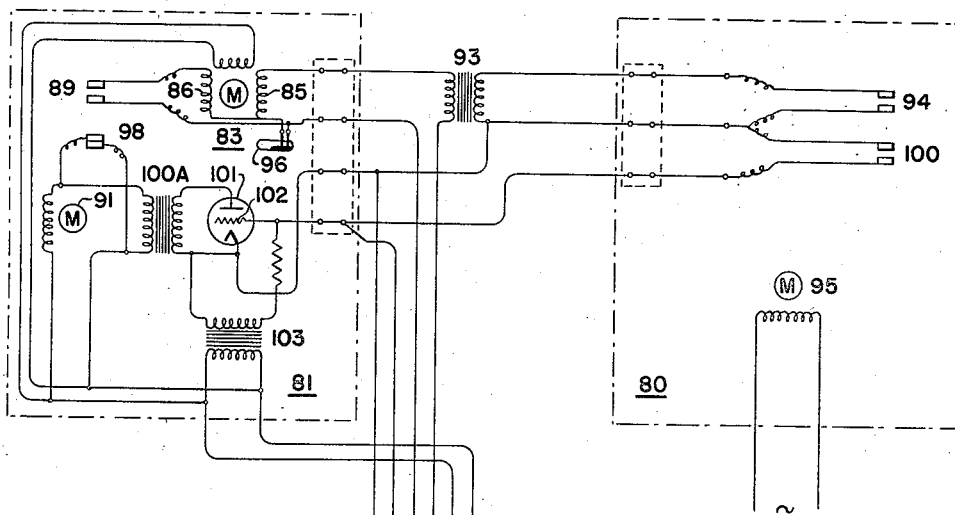
Fig. 7
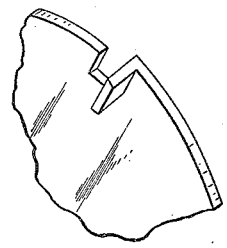
Fig. 6
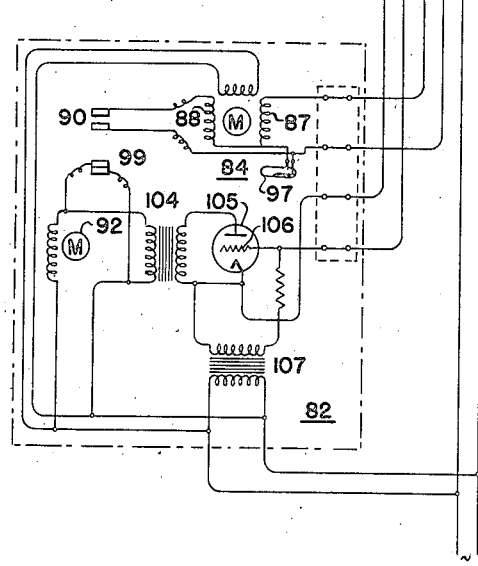
Inventor
JOHN D. RYDER
By Raymond W. Jenkins
Attorney Patented Aug. 13, 1940

2,211,711

UNITED STATES PATENT OFFICE 2,211,711

TELEMETRIC SYSTEM

John D. Ryder, University Heights, Ohio, assignor to Bailey Meter Company, a corporation of Delaware Application May 28, 1937, Serial No. 145,277

8 Claims. (Cl. 177—351)

This invention relates to telemetric systems for remotely indicating or otherwise exhibiting the magnitude of a variable.

In accordance with my invention periodic electric impulses of a time length proportional to or in relation to the magnitude of the variable originate at a transmitting station. In consonance with these impulses similar electric impulses originate in a receiving station of a time length proportional to or in relation to the position of the indicator or other exhibiting means, and the position of the indicator is varied to maintain the transmitting and receiving impulses of equal time length.

One feature of my invention resides in the mechanism employed at the transmitting and receiving stations whereby the electric circuits for originating the electric impulses are closed through individual contacts, but simultaneously opened through a common switch.

A further feature resides in the mechanical linkage employed at the transmitting and receiving stations whereby angularity is eliminated and movements of the indicator at all times agree precisely with movements of the device sensitive to the variable.

Still another feature resides in the simple means provided for maintaining the cyclically operable means employed at the transmitter and receiver for originating the electric impulses in exact phase.

A further feature resides in the means provided for eliminating the effects of back lash on such cyclically operable means as may be present in the gear reduction incorporated in the driving mechanisms therefor.

In the drawings:

Fig. 3 is a wiring diagram of the arrangements of Figs. 1 and 2.

Figs. 4, 5 and 6 are details of cams of Figs. 1 and 2.

Fig. 7 is a wiring diagram for one transmitter and two receivers.

Figure 1:
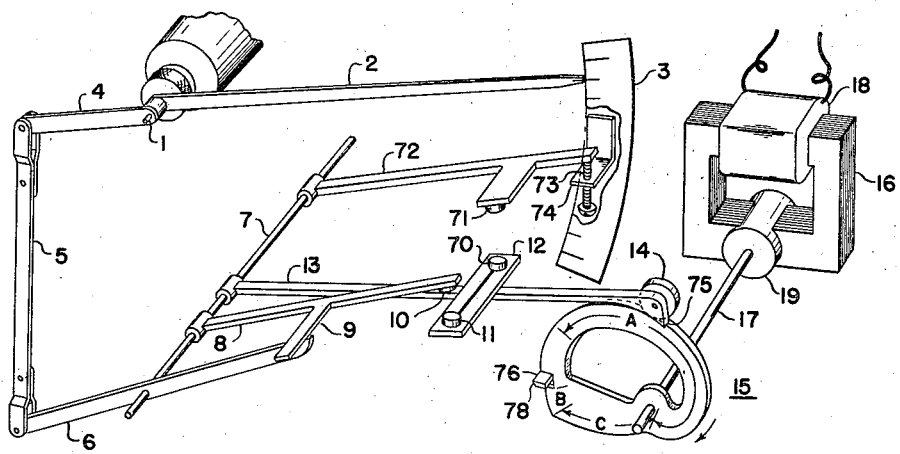
Fig. 1 illustrates in somewhat diagrammatic fashion, a transmitting mechanism.

Referring to Fig 1, I have shown a transmitting station in which is a spindle 1 angularly positioned by a device (not shown) responsive to the variable, the magnitude of which it is desired to remotely indicate, record or otherwise exhibit. For example, the spindle 1 may be positioned by a rate of flow meter sensitive to the differential produced by an orifice or other primary element and varying in known relation to the rate of fluid flow therethrough, or it may be positioned by a Bourdon tube sensitive to pressure or temperature. In other instances it may be positioned manually, so that commands, orders, or other intelligence may be transmitted to the receiving station.

Secured to the spindle 1 is an index 2, which in cooperation with a suitably graduated scale 3 gives an indication of the magnitude of the variable at the transmitting station. Likewise secured to the spindle 1 is an arm 4 pivotally connected through a link 5 to a transmitting arm 6 angularly positionable about a shaft 7. Angular movements of the spindle 1 are, therefore, mechanically transmitted to the arm 6. Also mounted on the shaft 7 is a member 8 having a projection 9 normally resting by gravity on the arm 6. As the arm 6 is positioned about the shaft 7 the member 8 is also positioned through the agency of the projection 9.

Carried by the member 8 is a contact 10 arranged to engage a cooperating contact 11 secured to a plate 12 mounted on a follower arm 13, one end of which is pivotally supported by the shaft 7. The opposite end of the follower 13 is provided with a pin on which is rotatably mounted a cam follower 14 engaging the contour of a cam 15, continuously rotated in the direction of the arrow by a synchronous motor 16 through a shaft 17. The motor 16 is energized through a field winding 18 which may be connected to any suitable source of alternating current and is provided with an integral gear reduction unit 19, so that the shaft 17 rotates at a relatively low speed.

The follower 13, through the cam 15, is periodically oscillated between predetermined limits. At some point in its travel, depending upon the position of the arm 6, the member 8 is picked up and carried to the upper travel limit, whence the member 8 is returned to its normal position when the extension 9 engages the arm 6. The rising section of the cam 15 designated by the angle A in Fig. 1 is substantially uniform, so that the increment of time during which the contact 10 is in engagement with the contact 11 while the follower 14 engages this section of cam 15 bears a functional relation to the magnitude of the variable angularly positioning the spindle 1.

Figure 2:
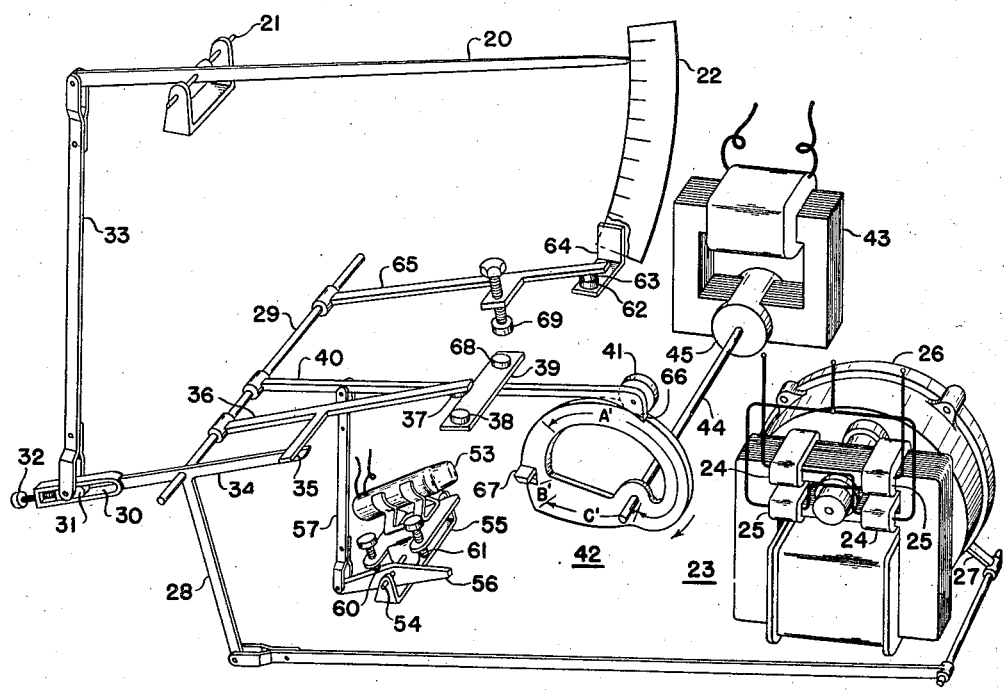
Fig. 2 illustrates in similar manner, a receiving mechanism.

In Fig. 2 is shown a receiving station in some respects similar to the transmitting station in which is an index 20 pivotally supported by a shaft 21 and cooperating with a suitably graduated scale 22 to remotely indicate the magnitude of the variable angularly positioning the spindle 1. The index 20 is positioned by a reversible motor 23 having opposed wound split shading poles 24 and 25. If the pole 24 is short circuited the motor 23 rotates in one direction. If the pole 25 is short circuited the motor rotates in the opposite direction. With both poles simultaneously energized or deenergized the motor is not urged to rotation. The motor 23 is provided with a gear reduction 26 so that a crank arm 27 positioned by the output shaft of the gear reduction moves through a relatively small angle for a large angular motion of the motor.

The crank arm 27 positions the index 20 through a receiving arm 28 pivoted on a shaft 29 and provided with a slot 30. A block 31 adjustable radially with respect to the shaft 29 by a screw 32 is guided in the slot 30 and is pivotally connected to a link 33 likewise pivotally connected to the index 20. Movement of the block 31 toward the shaft 29 serves to decrease the angular motion of the index 20 for a given angular motion of the crank 27. Conversely movement of the block 31 away from the shaft 29 serves to increase the movement of the index 20 for a given movement of the crank 27. Through the agency of this adjustment any desired angular travel of the index 20 may be obtained for a given angular travel of the index 2.

The receiving arm 28 is provided with an extension 34 upon which normally rests by gravity an extension 35 of a member 36 movably mounted on the shaft 29. Carried by the member 36 is a contact 37 arranged to engage a cooperating contact 38 secured to a plate 39 mounted on a follower arm 40 pivoted about the shaft 29. The arm 40 through a rotatable follower 41 is periodically oscillated between predetermined limits by a cam 42 continuously rotated by a self-starting synchronous motor 43 through a shaft 44. The motor 43 is similar to the motor 16 and is provided with an integral gear reduction 45 so that cams 15 and 42, identical in contour, rotate in synchronism with each other. The cam 42 is provided with a rising section A' similar to section A of cam 15, so that the increment of time during which contact 37 is in engagement with contact 38, while the follower 41 engages section A' bears a functional relation to the position of the index 20.

Referring to Fig. 3, the transmitter is generally indicated at 50 and the receiver at 51. When contacts 10, 11 engage, the pole winding 24 of motor 23 is short circuited, thereby tending to produce rotation in one direction. Similarly when contacts 37, 38 engage, winding 25 of motor 23 is short circuited, tending to produce rotation in the opposite direction. When the position of index 20 agrees with that of index 2, contacts 10, 11 and 37, 38 engage at the same instant and motor 23 remains stationary. If the index 2 is positioned downwardly a predetermined amount by the spindle 1, then contacts 10, 11 will engage prior to engagement of contacts 37, 38 and motor 23 will rotate in a direction to position the receiving arm 28 in a clockwise direction, so that index 20 is positioned downwardly. Until indices 2 and 20 are brought into proper correspondence contacts 10, 11 will continue to engage prior to contacts 37, 38 and during each cycle of operation motor 23 will operate to position the receiving arm 28 in a clockwise direction until proper correspondence is restored. Conversely, if the index 2 is positioned upwardly, then contacts 37, 38 will engage prior to contacts 10, 11 and the motor 23 will rotate to position the receiving arm 28 in a counterclockwise direction, thereby positioning the index 20 upwardly and such upward positioning will continue for an increment of each cycle of operation until proper correspondence is restored.

The windings 24, 25 are shown connected to a common neutral 52, in which is located a mercury switch 53. As shown in Figs. 2 and 3 the mercury switch 53 is in closed position. However, upon the follower 40 being positioned upwardly to the termination of the cam section A' the mercury switch 53 is thrown to open position, thereby simultaneously open circuiting the windings 24, 25 notwithstanding that contacts 10, 11 and 37, 38 remain engaged. As shown in Fig. 2 the mercury switch 53 is pivotally supported on a shaft 54 mounted in a stationary bracket 55. Likewise supported on the shaft 54 is a beam 56 pivotally connected to the arm 40 through a link 57. Mounted in the base of the mercury switch 53 are adjustable screws 60 and 61 arranged to engage the beam 56. The screws 60 and 61 are adjusted so that upon the mercury switch 53 being thrown to open position it will remain open until the follower approaches the origin of the rising section A' when it is restored to the closed position, so that windings 24 and 25 will be energized upon engagement of contacts 10, 11 and 37, 38 respectively.

It is apparent from the foregoing description of the operation of mercury switch 53 that the shape of cams 15 and 42 after the terminus of rising sections A and A' respectively are passed has no effect upon the operation of motor 23, for regardless of when the contacts 10, 11 and/or 37, 38 disengage the motor remains stationary as the neutral has been opened. The windings 24, 25 are therefore only short circuited through contacts 10, 11 and 37, 38 respectively, whereas they are open circuited through mercury switch 53. As known, contacts such as 10, 11 and 37, 38 when used to deenergize a circuit may cause sparking, which is not only injurious to the contacts but, if surrounded by an explosive atmosphere, may cause serious explosions. Engagement of contacts 10, 11 and 37, 38 energizing the windings 24 and 25 creates negligible sparking. The mercury switch 53 is confined within a controlled atmosphere so that sparking occurring therein in no way disturbs the operation of the system or gives rise to explosion hazards.

As hereinbefore stated, cams 15 and 42 operate in synchronism and in exact phase, so that the point on the contour of cam 42 engaged by follower 41 agrees exactly with the point on the contour of cam 15 engaged by follower 14. When initially placing the device in operation, or after a power failure, a phase displacement between cams 15 and 42 may exist. To restore the desired phase I provide means for comparing the position of cam 42 once each revolution with the position of cam 15, and if displaced therefrom retarding the motor 43 until proper phase is restored. Once restored cams 15, 42 will remain in phase inasmuch as in the preferred embodiment they are driven by similar synchronous motors.

The motor 43 is normally energized through closed contacts 62, 63. A bracket 64 supports the contact 62, whereas the contact 63 is carried by a member 65 pivotally mounted on the shaft 29. Once each revolution of the cam 42 an extension 66 on the arm 40 engages a laterally extending lip 67 on cam 42. Such engagement causes the roller 41 to be raised above the cam 42 and for an anvil 68 to engage an adjustable screw 69 carried by the member 65. The member 65 is then oscillated about shaft 29 sufficient to cause disengagement of contacts 62, 63, thereby opening the circuit normally energizing the motor 43.

Connected in parallel with contacts 62, 63 are contacts 70, 71. The contact 70 is carried by the plate 12, whereas the contact 71 is carried by a member 72 pivotally mounted on shaft 7 and normally supported at the opposite end by an adjustable screw 73 carried by a fixed bracket 74. The member 13 is provided with a projection 75 arranged to engage a lip 76 on cam 15. Engagement of the projection 75 with the lip 76 raises the member 13 sufficiently so that contact 70 engages contact 71, thereby serving to energize the motor 43.

If cams 15, 42 are in phase, contacts 70, 71 will engage at the instant contacts 62, 63 disengage, and contacts 62, 63 will reengage at the instant contacts 70, 71 disengage, thereby effecting continuous energization of the motor 43. Should the cam 42 lead the cam 15, contacts 62, 63 will open before contacts 70, 71 engage and the motor 43 will be deenergized for a short interval each revolution of cam 42, retarding the same a small amount at each operation until the opening of contacts 62, 63 occurs at the instant contacts 70, 71 close and cams 42, 15 are brought into phase. If cam 42 lags cam 15, contacts 62, 63 will remain open after the contacts 70, 71 have disengaged, interrupting the receiver motor circuit every revolution until cam 42 is sufficiently retarded so that motor 43 will not coast to a closed position of contacts 62, 63. Cam 42 will then be stationary for one revolution of cam 15, or until contacts 70, 71 again close, at which time the motor 43 will be energized and cam 42 will lead cam 15. Thereafter motor 43 will be deenergized for a short interval in each revolution of cam 42 until proper phase relationship is again restored.

In Fig. 4 I have shown the cam 42 and associated parts in the position occupied at the beginning of the phasing operation. The projection 66 is in engagement with the lip 67 and roller 41 is raised from cam 42. At approximately this instant as determined by the adjustment of screw 69 contact 62 disengages contact 63. In the transmitter, if cams 42 and 15 are in phase, at this same instant cam 15 and associated parts occupy the same relative positions as shown in Fig. 4, and contacts 70, 71 engage. It will be observed that at this instant when roller 41 leaves cam 42 its center is still to the right of radial edge 77 of cam 42. With cam 42 rotating in the direction of the arrow it is apparent that any backlash present in gear reduction unit 45, would upon roller 41 rolling over edge 77, cause cam 42 to jump forward. By providing that the roller 41 is lifted from the contour of cam 42 before its center is on a radial line with edge 77 such imperfect operation is eliminated, the extension 66 dragging on the lip 67 serving to maintain the backlash present in the gear reduction unit 45 in the same direction.

In Fig. 5 are shown the relative locations of cam 42 and associated parts at the termination of the phasing period. Roller 41 has passed completely beyond the radial edge 77 of cam 42 and extension 66 is just about to drop over edge 77. The follower 41 will fall to a constant radius section B', as shown clearing entirely the edge 77. The radial edge 77 forming a sheer drop to the constant radius section B' provides a means for disengaging contacts 62, 63 at an exact point in the angular travel of cam 42, thereby facilitating the adjustment of contacts 62, 63 relative to contacts 70, 71. If desired edge 77 may be slightly undercut, so that the possibility of engagement of extension 66 therewith during its drop to constant radius section B' will be avoided.

By providing the constant radius section B', reaction on the motor 43 and gear reduction 45 due to the impact of the falling parts which would otherwise be present is also avoided. A falling section C' of cam 42 extends from the terminus of constant radius section B' to the origin of the rising section A', and serves to carry member 40 to its initial or starting position.

Cam 15 is identical with cam 42, an edge 78 forming a sheer drop to a constant radius section B, which is followed by a falling section C extending to the origin of rising section A. The operation therefore of cam 15 and associated parts is exactly similar to that described with reference to cam 42 and illustrated in Figs. 4 and 5.

As previously described, mercury switch 53 is thrown to open position at the terminus of section A' of cam 42. The exact location of the terminus of section A' is unimportant so long as it occurs before projection 66 engages lip 67. It will be observed that during phasing operation, therefore, motor 23 is deenergized so that if because cams 15 and 42 are out of phase motor 43 is stopped momentarily or for one revolution of cam 15, incorrect positioning of index 20 will not occur.

Referring now to Fig. 7 I have therein shown a single transmitter 80 arranged to control a plurality of receiving stations generally indicated at 81 and 82. I have shown two receiving stations coupled with a single transmitting station merely for purposes of illustration and it will be obvious from the following description that a single transmitting station may be coupled with any number of receiving stations located remotely therefrom and from each other.

The mechanism within transmitting station 80 is identical with that shown in Fig. 1 and the mechanism within the receiving stations 81 and 82 is identical with that shown in Fig. 2. Within the receiving stations 81 and 82 are reversible motors 83 and 84 respectively, corresponding to motor 23. The motor 83 has opposed windings 85 and 86 respectively, whereas motor 84 has opposed windings 87 and 88. Windings 86 and 88 are periodically energized through closure of contacts 89 and 90 respectively, periodically oscillated by motors 91 and 92, corresponding to motor 43. Opposed windings 85, 87 are connected in series with each other and with the primary of a transformer 93. The secondary of the transformer 93 is periodically short circuited by contacts 94 closed by motor 95 correspondingly to motor 16 in Fig. 1.

In operation contacts 89 and 90 are periodically closed for increments of time depending upon the position of the indices (not shown) moved by motors 83 and 84 respectively. Concurrently therewith windings 85 and 87 are simultaneously energized through closure of contacts 94. The increment of time during which contacts 94 are closed is, as hereinbefore described, dependent upon the magnitude of the variable being measured. Through the agency of the transformer 93 the potential across the contacts 94 may be maintained at a relatively low value when normal potential exists across windings 85 and 87.

Included in the neutral winding of motors 83 and 84 are mercury switches 96 and 97 respectively, periodically thrown to open position as described with reference to mercury switch 53 shown in Fig. 2.

To maintain motors 91 and 92 in proper phase relationship with motor 95 I show within receiving station 81 normally closed contacts 98 and within receiving station 82 normally closed contacts 99, corresponding to contacts 62, 63 as shown in Fig. 2. Periodically contacts 98, 99 are open circuited. Simultaneously contacts 100 within transmitter station 80 engage, serving to maintain continuous energization of motors 91 and 92 if they are in proper phase relationship with motor 95.

Connected in parallel with contacts 98 across motor 91 is the primary of a transformer 100A, the secondary of which is connected in the output circuit of an electron discharge device 101. The grid 102 is normally biased through a transformer 103 to maintain the output circuit deenergized. Closure of contacts 100 acts, however, to change the grid bias and render the electron discharge device 101 conducting, thereby reducing the impedance of the primary of the transformer 100A sufficiently so that motor 91 is energized. Accordingly, if operation of contacts 98 and 100 occur in proper sequence motor 91 will be continuously energized. If however due to lack of proper phase such sequential operation does not occur, the motor 91 will be retarded until proper phase relationship with respect to motor 95 is restored.

Within receiving station 82 is a similar arrangement for maintaining proper phase relationship between motors 92 and 95. Connected in parallel with the contacts 99 across motor 92 is the primary of a transformer 104, the secondary of which is connected in the output circuit of an electron discharge device 105, having a grid 106. Normally biased by means of a transformer 107 to render the output circuit non-conducting. The grid 106 is connected in parallel with grid 102 across contacts 100. Closure of contacts 100 acts therefore to simultaneously change the bias of grid 106, as well as grid 102. The change in bias of grid 106 serves to reduce the impedance of the primary winding of transformer 104 sufficiently so that motor 92 is energized.

Normally, therefore, motors 91 and 92 are energized by contacts 98 and 99 respectively. Periodically these contacts disengage, so that if motor 91 or motor 92 is not in phase with motor 95 it is retarded. Normally, however, contacts 100 will engage during the increment of time contacts 98 and 99 are disengaged, so that motors 91 and 92 are continuously energized.

While I have described my invention and preferred embodiments thereof, I desire it to be understood that I am not to be limited thereby except as to the claims in view of the prior art.

Certain portions of my invention, disclosed but not claimed herein, is disclosed and claimed in my divisional application Serial No. 317,833 filed February 8, 1940 and co-pending.

What I claim as new, and desire to secure by Letters Patent of the United States, is:

1. In a telemetric system, in combination, a transmitter comprising a shaft, a transmitting arm angularly positioned about said shaft in accordance with the magnitude of a variable, a contact member pivoted on said shaft and normally resting on said transmitting arm, a cam, a follower member pivotally mounted on said shaft and engaging said cam, a motor for continuously rotating said cam whereby said follower member is cyclically oscillated through a predetermined course, contact means carried by said follower member moved into engagement with said contact member and carrying said contact member through a portion of said course dependent upon the position of said transmitting arm, and an electrical circuit controlled by the engagement of said contact means and contact member.

2. In a telemetric system, in combination, a transmitter comprising a shaft, a transmitting arm angularly positioned about said shaft in accordance with the magnitude of a variable, a contact member pivotally mounted on said shaft and normally resting on said transmitting arm, a cam having a rising and a falling section, a follower member having one end pivotally mounted on said shaft and the other engaging said cam, a motor for rotating said cam to periodically reciprocate said follower member through a predetermined cyclic course, and carry said contact member through a portion of said cyclic course determined by the position of said transmitting arm, an electric circuit, means for closing said circuit actuated upon engagement of said follower and contact members, and means operated by said follower member for opening said circuit before said contact and follower members disengage.

3. In a telemetric system, in combination, a transmitter comprising a shaft, a transmitting member angularly positioned about said shaft in accordance with the magnitude of the variable, a contact member mounted on said shaft and normally resting on said transmitting member, cyclically operable means for periodically oscillating said contact member about said shaft from said normal position of rest to a predetermined position and returning said member to engagement with said transmitting member, an electric circuit energized by engagement of said contact member and cyclically operable means operated by said cyclically operable means, and means for deenergizing said circuit before said contact member and cyclically operable means disengage.

4. In a telemetric system, in combination, a transmitter comprising a shaft, a transmitting member angularly positioned about said shaft in accordance with the magnitude of a variable, a contact member pivotally mounted on said shaft and normally resting on said transmitting arm, cyclically operable means for periodically oscillating said contact member about said shaft from said normal position of rest to a predetermined position and returning said member to said normal position, a receiver comprising a reversible motor having opposed windings, a shaft, a receiving arm angularly positioned about said shaft by said motor, a contact member pivotally mounted on said shaft and normally resting on said receiving arm, cyclically operable means for periodically oscillating said contact member about said shaft from said normal position to a predetermined position and returning said contact member to said normal position, means for energizing one of the windings of said motor when said contact member in said transmitter is moved from said normal position, means for energizing the opposed winding when said contact member in said receiver is moved from said normal position, and means under the control of one of said said cyclically operable means for simultaneously deenergizing said windings before said contact members are restored to said normal positions.

5. In a telemetric system, a transmitting station and a plurality of receiving stations, a motor having opposed windings located in each of said receiving stations, energization of one of said windings urging said motor to operation in one direction, energization of the other of said windings urging said motor to operation in opposite direction, an electric circuit connecting one winding of each of said motors in series, a transformer having a primary winding connected in said circuit, means under the control of said transmitting station for periodically short circuiting the secondary of said transformer for increments of time in accordance with the magnitude of a variable to energize all of said last named windings simultaneously, and means under the control of each of said receiving stations for periodically energizing the other winding of the motor associated therewith.

6. In a telemetric system, a transmitting station and a plurality of receiving stations, a motor having opposed windings located in each of said receiving stations, energization of one of said windings urging said motor to operation in one direction, energization of the other of said windings urging said motor to operation in opposite direction, an electric circuit connecting a winding of each of said motors in series, means under the control of said transmitting station for energizing said circuit, and means under the control of each of said receiving stations for energizing the other winding of the motor located therein.

7. In a telemetric system, a transmitting station and a plurality of receiving stations, a motor having opposed windings located in each of said receiving stations, energization of one of said windings urging said motor to operation in one direction, energization of the other of said windings urging said motor to operation in opposite direction, a member positioned by each of said motors, an electric circuit connecting a winding of each of said motors in series, a transformer having a primary winding connected in said circuit, means under the control of said transmitting station for periodically short circuiting the secondary of said transformer for increments of time proportional to the magnitude of a variable to energize all of said windings simultaneously, and means under the control of each of said members for energizing the other winding of the motor associated therewith for increments of time proportional to its position.

8. In a telemetric system, in combination, a transmitter comprising a shaft, a transmitting member angularly positioned about said shaft in accordance with the magnitude of a variable, a contact member mounted on said shaft and normally resting on said transmitting member, a first cyclically operable means for periodically oscillating said contact member about said shaft from said normal position of rest to a predetermined position and returning said member to engagement with said transmitting member, an electric circuit energized by engagement of said contact member and cyclically operable means, a second cyclically operable means, and means operated by said second cyclically operable means for deenergizing said circuit before said contact member and cyclically operable means disengage.

JOHN D. RYDER.